Sept. 26, 1961　　　　　H. HEZEL　　　　　3,001,503
INSTRUMENT DIAL

Filed Aug. 21, 1958　　　　　　　　　　2 Sheets-Sheet 2

INVENTOR.
HERMAN HEZEL
BY Ostrolenk, Faber,
Gerb & Soffen
ATTORNEYS

United States Patent Office 3,001,503
Patented Sept. 26, 1961

3,001,503
INSTRUMENT DIAL
Herman Hezel, Port Washington, N.Y., assignor to Kollsman Instrument Corporation, Elmhurst, N.Y., a corporation of New York
Filed Aug. 21, 1958, Ser. No. 756,415
7 Claims. (Cl. 116—129)

This invention relates to a dial structure for an instrument wherein the required rotation of a pointer associated with the instrument is decreased.

Many instruments, particularly those used in conjunction with aircraft, have to reproduce a measurement which may be observed by means of a pointer and dial where the input motion to the pointer is extremely small. By way of example, an altimeter is primarily energized from the relatively limited motion of an evacuated diaphragm exposed to the atmosphere external of the aircraft. In such an instrument, the net reading is normally broken up into a main reading, given by a first dial or counter which indicates thousands of feet, and then to a subsidiary reading which indicates subsidiary readings within the main readings. Thus, if the main reading is broken into thousands of feet, the subsidiary reading would be from zero to 1,000.

This subsidiary reading is generally comprised of a dial and pointer wherein a complete rotation of the pointer would go from zero to a thousand feet. Since the potential altitude the aircraft may achieve is high, and one full revolution of the subsidiary or fine indicating pointer is small, the fine pointer has to make a substantial number of revolutions throughout the altitude range of the aircraft. This requires an extremely great motion amplification between the input diaphragm which measures the altitude and the fine pointer. By way of example, it may be necessary for the pointer to be rotated 90 times or more in order to cover a complete altitude range.

The principle of my invention is to decrease this required number of revolutions of a fine or subsidiary pointer, while still retaining the desirability of a subsidiary pointer which is calibrated so that it may be easily monitored by the operator using the instrument.

Accordingly, if the instrument fine pointer sweeps from zero to 10 for one full dial sweep, I place the zero-through-10 indication on only one-half of the dial surface, while the other half is not utilized for the instrument observation. A double ended pointer is then used wherein the first half of the pointer will sweep the calibrated one-half of the instrument and go from zero to 10. As this first half reaches the value 10, the second half will now move into the calibrated zone of the instrument, and this second half will thereafter be utilized as the pointer continues the turn. Accordingly, the instrument will go through two full sweeps (since each half of the pointer sweeps the calibrated area twice), although the pointer only makes a single revolution.

Accordingly, it is seen that I can cut the required number of revolutions of the pointer in half, while still retaining the highly desirable calibration which goes from 1 to 10 for the instrument. That is to say, it is not necessary, with this type of calibration, for the operator of the instrument to do any mental computation, as would be required if the full instrument remained calibrated from 1 to 20.

This novel principle may now be expanded whereby the required number of revolutions of the pointer can be cut to one-third by calibrating only one-third of the dial surface, and providing three symmetrically arranged pointers. Similarly, the number of rotations will be reduced to one-fourth that normally required by calibrating only one-fourth of the instrument and providing four symmetrically arranged pointers. Generally, therefore, $n$ symmetrically arranged pointers which cooperate with $$\frac{1}{n}$$

of the area of the dial will yield a structure requiring only $$\frac{1}{n}$$

of the number of rotations that would be required in a conventional instrument display.

However, I retain the advantages of calibrating this fine pointer so that each full sweep of any angle indicator of the full calibrated area will still be conveniently calibrated, so that a full reading, including the fine indication, is easily obtained without any required mental computation on the part of the operator.

In order to prevent confusion to the operator as to which pointer is to be read, it is possible to either shield the inactive portion of the dial, or to camouflage it so as to blend with a camouflaging of the needle, whereby the only easily visible pointer will be the active pointer in the active portion of the dial.

A further application of this novel invention would be in instruments which give a positive reading when the needle is on one side of the zero dial, and a negative reading when the pointer is on the other side of the zero dial. In this type of instrument, the pointer must go through a full rotation in order to cover the full range of positive and negative values.

In accordance with my invention, however, by eliminating one-half of the dial surface, and using a double ended pointer, one half of the double ended pointer will sweep through positive values, while the other end of the pointer will sweep through negative values. When a negative value is to be displayed, the negative pointer is in use, the positive value pointer will be hidden from view or camouflaged in any desired manner. Similarly, when a positive value is to be displayed, the positive pointer is in use and the negative pointer will be camouflaged or hidden.

Accordingly, the primary object of this invention is to provide a novel instrument dial presentation.

Another object of my invention is to provide a novel fine pointer system for instrument dials wherein the number of required rotations of the pointer are decreased, although the same information is presented as in the normal manner.

Another object of this invention is to provide a novel instrument dial wherein $n$ pointers cooperate with only $$\frac{1}{n}$$

of the active surface of the dial, this $$\frac{1}{n}$$

portion of the surface containing the full calibration that would normally be contained on the full dial.

Another object of this invention is to provide a novel instrument dial wherein only a portion of the dial area is calibrated and cooperates with a plurality of symmetrically placed pointers, and the pointers not in the area of the calibrated portion of the dial are obscured from the observer's view.

These and other objects of my invention will become apparent from the following description when taken in connection with the drawings; in which.

Figure 1:
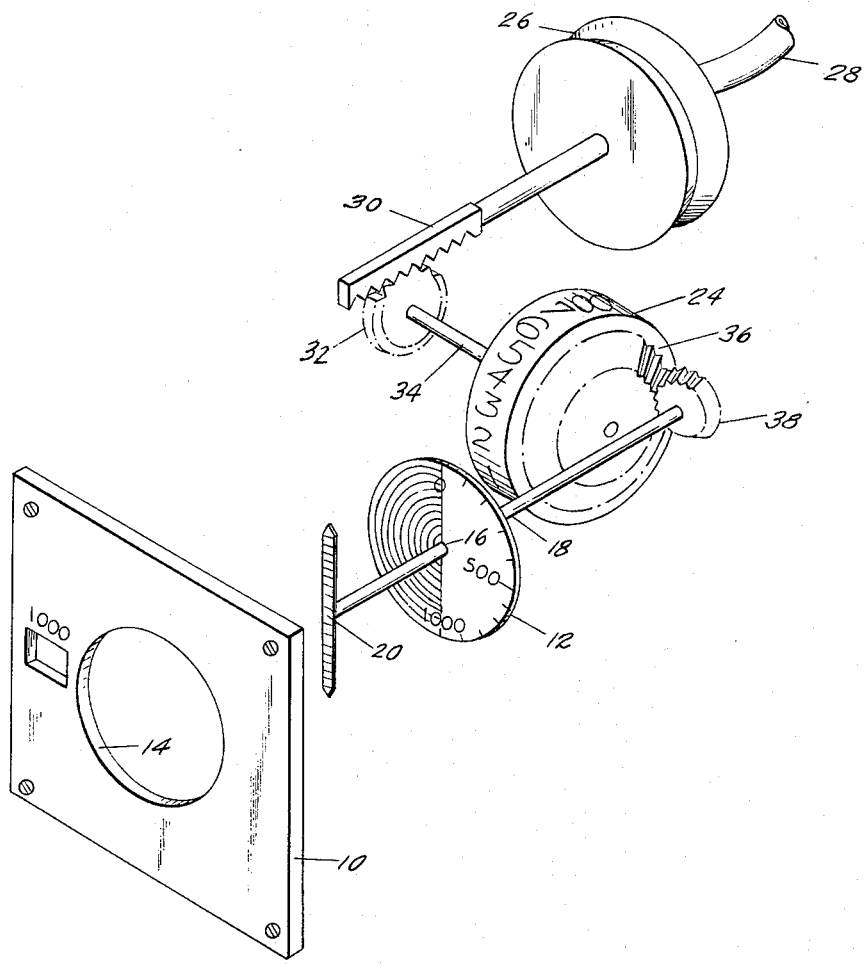
FIGURE 1 is an exploded perspective view of one type of instrument to which my novel invention may be applied.

Referring now to FIGURE 1, the instrument shown therein is comprised of a cover-plate 10 which receives a dial 12 in its aperture 14. The dial 12 has a small opening 16 in the center thereof, and a shaft 18 extends through aperture 16. Shaft 18 is terminated by a double ended pointer 20 which will be described more fully hereinafter.

Dial 12 is further provided with a rectangular opening 22 which serves as a window for indicating drum 24, which indicating drum, as will be seen hereinafter, serves as the coarse indication for the instrument. The drum 24 and pointer 20 are positioned in accordance with the expansion or contraction of diaphragm 26 which is connected to some pressure source over conduit 28. Thus, the diaphragm 26 may cause the instrument to operate as an altimeter, or any other type of pressure measuring device.

It is to be understood, however, that while FIGURE 1 shows a diaphragm 26 as the input of the system, any motion producing means could be utilized as an input.

A central portion of diaphragm 26 is connected to rack 30, and drives the rack 30 in an axial direction depending upon the expansion or contraction of the diaphragm. The rack 30 cooperates with a pinion 32 which drives shaft 34. Shaft 34 is then rigidly secured to rotate both drum 24 and gear 36 which could be attached to drum 24. Gear 36 then cooperates with gear 38 in order to transfer the motion from shaft 34 to shaft 38 which is at right angles to shaft 34, as well as to amplify the motion from drum 24 to pointer 20.

Figure 2:
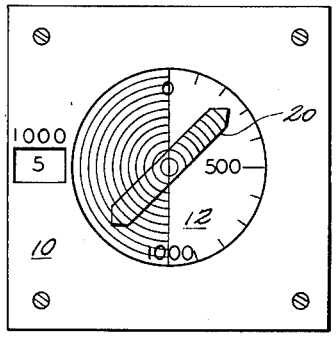
FIGURE 2 is a front view of the assembled instrument of FIGURE 1.

For illustrative purposes, drum 24 is shown as calibrated from 1 to 10 which will be read as thousands, while only the right half of dial 12 is calibrated from zero to 1000 (see FIGURE 2). Thus, the motion amplification between gears 36 and 38 must be such that the drum 24 will advance one digit, while the pointer 20 must make one-half of a full rotation.

This is to be contrasted to the prior art structure wherein the motion amplification would have to be double that shown in the figure, since, in the prior art, the full dial surface would be calibrated, and a full pointer rotation would be required to go from zero to 1000.

In the case of the instant invention, however, only a half rotation is required for one full sweep of the fine dial 20, although the ease of reading a dial calibrated from zero to 1000 is retained.

Since the required rotation of the fine dial 20 is reduced, it will be obvious to those skilled in the art that the accuracy of the instrument will be substantially increased and the load on the diaphragm 26 will be substantially decreased.

In order to prevent confusion to the dial observer, the inactive half of the pointer may be camouflaged as by drawing semi-circles in the left and inactive half of the dial in FIGURE 2, which will cooperate with small arcs drawn on the pointer 20. The pointer portion which is in the left-hand area of the dial will, therefore, blend to the background, and only the active portion of the pointer will be readily observable in the right-hand area.

Accordingly, as the pointer half in the right-hand area sweeps from zero to 1000, the other and inactive half will be camouflaged. When, however, the full half rotation is finished, and a second half of the rotation continues, the pointer portion which was originally hidden will now emerge into the active portion of the dial, while the previously active portion of the pointer will now be hidden against the background of the left-hand side of the dial.

The type of camouflaging set forth in FIGURES 1 and 2 are, of course, illustrative only, and many systems could be utilized. By way of example, in FIGURE 3, the camouflaging is achieved by a physical shield 40 which is placed over the left-hand side of the dial surface of dial 12.

Figure 3:
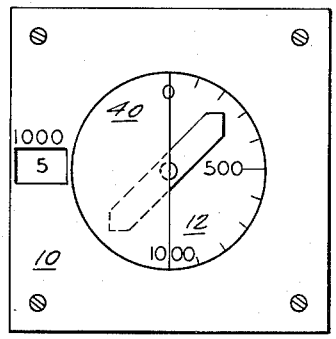
FIGURE 3 is a second embodiment of the device of FIGURE 2 wherein the camouflaging of the inactive portion of the indicator is achieved by shielding.
Figure 4:
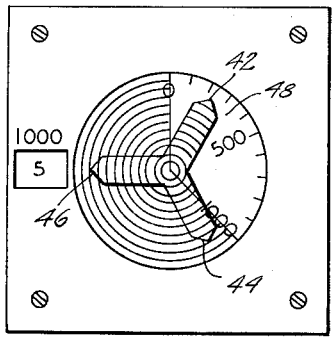
FIGURE 4 illustrates a third embodiment of my novel invention wherein three pointer segments are utilized.

While FIGURES 1 through 3 have illustrated my novel invention in conjunction with a double ended pointer which cooperates with only one-half of the area of the dial, it is clear that the general concept of my invention extends itself to the case where $n$ symmetrically arranged pointer portions will cooperate with $$\frac{1}{n}$$

of the area of the dial surface. Thus, in FIGURE 4, the pointer is shown as comprised of three symmetrically arranged segments 42, 44 and 46. These three pointer segments cooperate with one-third of the area of the dial 48. That is to say, a one-third segment of the full circle of the dial is the only active portion of the dial. In this case, a full rotation of pointers 42, 44 and 46 will cause each of them to sweep past the calibrated area of dial 48 once, so that the number of full rotations required is reduced to one-third that which would be required had the conventional method utilizing the full dial surface been used. Obviously, this type of indication may be extended as far as desired.

Figure 5:
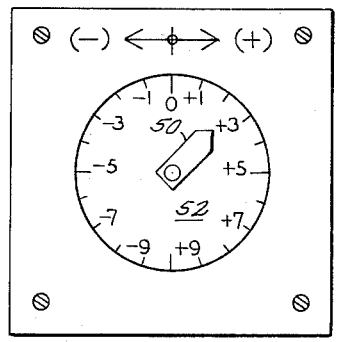
FIGURE 5 illustrates a commonly used instrument which presents positive and negative values.
Figure 6:
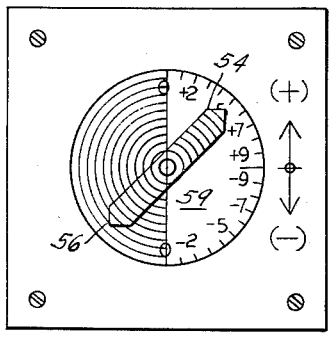
FIGURE 6 illustrates the manner in which my novel invention may be applied to achieve the function of the instrument of FIGURE 5, while requiring only ½ the rotation of the device of FIGURE 5.

A further application of my novel invention is set forth in FIGURES 5 and 6 in conjunction with a positive-negative type of indicating device. This type of device is normally constructed, as shown in FIGURE 5, as comprising a single pointer 50 which cooperates with a full dial surface 52. The left-hand semi-circle gives the negative portion of the reading and goes from zero to minus 10, while the right-hand semi-circle is the positive reading going from zero to plus 10. Thus, when the pointer 50 is to the right, a positive indication is being made, while when the pointer 50 is to the left, a negative indication is being made.

It will be observed, however, that the pointer 50 must make a full rotation in order to sweep the full range of positive and negative readings.

In accordance with my invention, as shown in FIGURE 6, I provide a double ended pointer having ends 54 and 56. Only one-half of the dial surface 54 is utilized in FIGURE 6 with the upper right-hand quadrant giving the positive readings, and the lower right-hand quadrant, the negative readings. Pointer 54 is utilized in making the readings from zero to plus 10. When the direction of rotation of the pointer is reversed, thus indicating a negative reading, the pointer 56 will sweep the negative values from zero to minus 10. When the negative pointer 56 is in use, the positive pointer 54 will be camouflaged, as by the circles similar to those used in FIGURE 2. Similarly, when the positive pointer 54 is active, or in use, the negative pointer 56 will be camouflaged.

From the above, it is clear that the full range of positive and negative readings will be made with the pointer being rotated only 180°, as contrasted to the full 360° rotation required in the prior art type of devices. Therefore, the instrument designer will be able to provide a more accurate instrument because the motion multiplication is not as severe as in the case of the device of FIGURE 5, even though the instrument sweeps a smaller area.

Furthermore, all of the ease of reading in the type of device of FIGURE 5 is retained in the device of FIG- URE 6, since there is always a full sweep of from zero to 10, or some similar easily readable calibration.

In the foregoing, I have described my invention only in connection with preferred embodiments thereof. Many variations and modifications of the principles of my invention within the scope of the description herein are obvious. Accordingly, I prefer to be bound not by the specific disclosure herein but only the appending claims.

I claim:

1. In a display instrument; a dial surface, an indicator and a driving means operatively connected to said indicator for driving said indicator with respect to said dial surface; said indicator being a pointer rotatably movable with respect to said dial surface in a plane parallel to said dial surface; said pointer having a first and second end; said dial surface having a predetermined portion of its area calibrated with information functionally related to the position of said pointer; a first angular displacement of said pointer by said driving means sweeping said first end of said pointer through said predetermined area of said dial surface; a continuing angular displacement of said pointer sweeping said second end of said pointer through said predetermined area of said dial surface; said first end of said pointer leaving said predetermined area when said second end of said pointer enters said predetermined area; a camouflaging means; said camouflaging means being associated with said dial surface to obscure said first pointer end when said second pointer end is in said predetermined area of said dial surface.

2. In a display instrument; a dial surface, an indicator and a driving means operatively connected to said indicator for driving said indicator with respect to said dial surface; said indicator being a pointer rotatably movable with respect to said dial surface in a plane parallel to said dial surface; said pointer having a first and second end; said dial surface having a predetermined portion of its area calibrated with information functionally related to the position of said pointer; a first angular displacement of said pointer by said driving means sweeping said first end of said pointer through said predetermined area of said dial surface; a continuing angular displacement of said pointer sweeping said second end of said pointer through said predetermined area of said dial surface; a camouflaging means; said camouflaging means being associated with said dial surface to obscure said first pointer end when said second pointer end is in said predetermined area of said dial surface; said camouflaging means comprising a plurality of radially displaced printed arcs on the area of said dial surface other than said predetermined area and a plurality of arcuately cooperating arcs on said pointer; all of said arcs having the axis of rotation of said pointer as center.

3. In a display instrument; a dial surface, an indicator and a driving means operatively connected to said indicator for driving said indicator with respect to said dial surface; said indicator being a pointer rotatably movable with respect to said dial surface in a plane parallel to said dial surface; said pointer having a first and second end; said dial surface having a predetermined portion of its area calibrated with information functionally related to the position of said pointer; a first angular displacement of said pointer by said driving means sweeping said first end of said pointer through said predetermined area of said dial surface; a continuing angular displacement of said pointer sweeping said second end of said pointer through said predetermined area of said dial surface; a camouflaging means; said camouflaging means being associated with said dial surface to obscure said first pointer end when said second pointer end is in said predetermined area of said dial surface; said camouflaging means comprising a masking means for masking all of said dial surfaces but said predetermined area from view.

4. An instrument display comprising a dial surface, an indicator and a driving means operatively connected to said indicator to rotatably drive said indicator with respect to said dial surface; a segmental area of said dial surface being active and calibrated and the remaining area of said dial surface being inactive; said indicator being comprised of $n$ symmetrically arranged pointers where $n$ is greater than one; said segmental area of said dial surface being $$\frac{1}{n}$$

of the complete area of said dial surface; a 360° rotation of said indicator giving $n$ sweeps of said calibrated area of said active instrument surface.

5. An instrument display comprising a dial surface, an indicator and a driving means operatively connected to said indicator to rotatably drive said indicator with respect to said dial surface; a segmental area of said dial surface being active and calibrated and the remaining area of said dial surface being inactive; said indicator being comprised of $n$ symmetrically arranged pointers where $n$ is greater than one; said segmental area of said dial surface being $$\frac{1}{n}$$

of the complete area of said dial surface; a 360° rotation of said indicator giving $n$ sweeps of said calibrated area of said active instrument surface; said camouflaging means for camouflaging all but said active area of said dial surface.

6. In a display instrument; a dial surface, an indicator and a driving means operatively connected to said indicator for driving said indicator with respect to said dial surface; said indicator being a pointer rotatably movable with respect to said dial surface in a plane parallel to said dial surface; said pointer having a plurality of ends; said dial surface having a predetermined portion of its area calibrated with information functionally related to the position of said pointer; a first angular displacement of said pointer by said driving means sweeping one of the ends of said pointer through said predetermined area of said dial surface; a continuing angular displacement of said pointer sweeping a second end of said pointer through said predetermined area of said dial surface; a further angular displacement sweeping similarly remaining pointer ends through the said predetermined area of said dial surface.

7. In a display instrument; a dial surface, an indicator and a driving means operatively connected to said indicator for driving said indicator with respect to said dial surface; said indicator being a pointer rotatably movable with respect to said dial surface in a plane parallel to said dial surface; said pointer having a plurality of ends; said dial surface having a predetermined portion of its area calibrated with information functionally related to the position of said pointer; a first angular displacement of said pointer by said driving means sweeping one of said ends of said pointer through said predetermined area of said dial surface; a continuing angular displacement of said pointer sweeping successive ends of said pointer through said predetermined area of said dial surface.

References Cited in the file of this patent

UNITED STATES PATENTS

| 2,182,572 | Schnell | Dec. 5, 1939 |
| 2,254,242 | Righi | Sept. 2, 1941 |
| 2,585,565 | Luck | Feb. 12, 1952 |

FOREIGN PATENTS

| 937,619 | France | Mar. 15, 1948 |
| 599,977 | Great Britain | Mar. 25, 1948 |